(12) United States Patent
Zhang et al.

(10) Patent No.: US 10,059,028 B2
(45) Date of Patent: Aug. 28, 2018

(54) METHOD FOR SCAVENGING FREE FORMALDEHYDE USING MULTIFUNCTIONAL SCAVENGER FOR WOODEN COMPOSITE PRODUCTS WITH UREA-FORMALDEHYDE RESIN

(71) Applicant: FPInnovations, Pointe-Claire (CA)

(72) Inventors: Yaolin Zhang, Quebec (CA); Xiang-Ming Wang, Quebec (CA); Zhenhua Gao, Harbin (CN)

(73) Assignee: FPInnovations, Pointe-Claire (CA)

( * ) Notice: Subject to any disclaimer, the term of this patent is extended or adjusted under 35 U.S.C. 154(b) by 0 days.

(21) Appl. No.: 15/525,984

(22) PCT Filed: Nov. 12, 2015

(86) PCT No.: PCT/CA2015/051167
§ 371 (c)(1),
(2) Date: May 11, 2017

(87) PCT Pub. No.: WO2016/074083
PCT Pub. Date: May 19, 2016

(65) Prior Publication Data
US 2017/0305033 A1    Oct. 26, 2017

Related U.S. Application Data

(60) Provisional application No. 62/079,021, filed on Nov. 13, 2014.

(51) Int. Cl.
*B27N 1/00*    (2006.01)
*B27N 1/02*    (2006.01)
*B27N 7/00*    (2006.01)

(52) U.S. Cl.
CPC ............ *B27N 1/006* (2013.01); *B27N 1/02* (2013.01); *B27N 7/00* (2013.01)

(58) Field of Classification Search
CPC ............ B27N 1/006; B27N 1/02; B27N 7/00

USPC ................................................. 428/537.1
See application file for complete search history.

(56) References Cited

U.S. PATENT DOCUMENTS

| 5,071,682 | A | * | 12/1991 | Moore | B27N 9/00 156/331.3 |
| 5,112,652 | A | * | 5/1992 | Greene | C09J 161/24 156/331.1 |
| 5,160,679 | A | * | 11/1992 | Greene | B27N 1/003 156/296 |
| 5,684,118 | A | * | 11/1997 | Breyer | C08G 12/38 156/307.3 |

FOREIGN PATENT DOCUMENTS

| WO | 0160937 A1 | 8/2001 |
| WO | WO0160937 | * 8/2001 |

OTHER PUBLICATIONS

Kim, S. (2009). The reduction of indoor air pollutant from wood-based composite by adding pozzolan for building materials. Construction and Building Materials 23(6): 2319-2323.
Meyer, B., W. E. Johns, J.K. Woo, (1980), formaldehyde release from sulfur-modified urea-formaldehyde resin systems, Forest Products Journal 30(3): 24-31.
Park, B.-D., E.-C. Kang, et al. (2008), Thermal curing behavior of modified ureaformaldehyde resin adhesives with two formaldehyde scavengers and their influence on adhesion performance, Journal of Applied Polymer Science 110(3): 1573-1580.
PCT International Search Report from corresponding PCT/CA2015/051167 dated Jan. 25, 2016.

* cited by examiner

*Primary Examiner* — Leszek B Kiliman
(74) *Attorney, Agent, or Firm* — Norton Rose Fulbright Canada LLP

(57) ABSTRACT

The application describes a method of scavenging formaldehyde from a wooden composite comprising urea-formaldehyde or melamine urea-formaldehyde by providing a combination of formaldehyde scavengers in the face and core layers of the composite and further describes the composite produced with these scavengers.

5 Claims, 1 Drawing Sheet

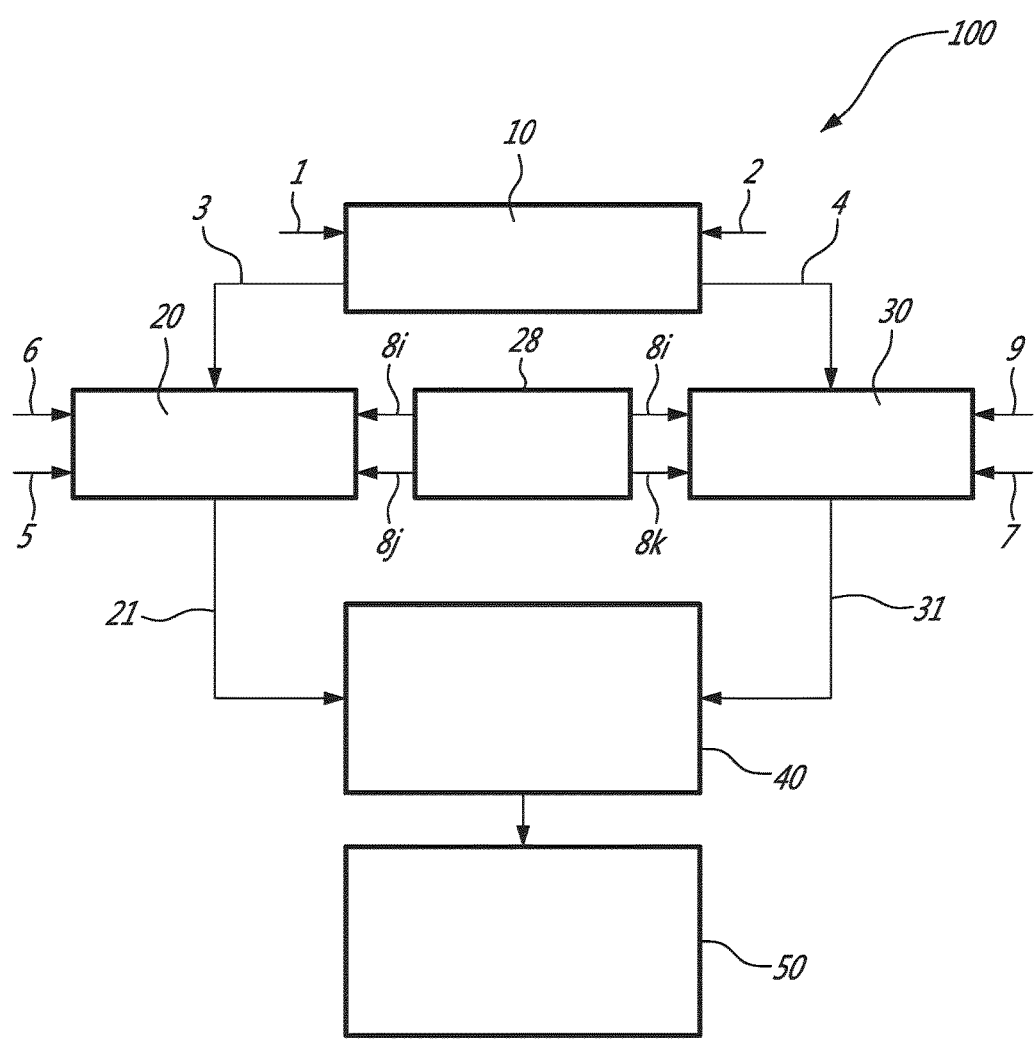

METHOD FOR SCAVENGING FREE FORMALDEHYDE USING MULTIFUNCTIONAL SCAVENGER FOR WOODEN COMPOSITE PRODUCTS WITH UREA-FORMALDEHYDE RESIN

CROSS-REFERENCE TO RELATED APPLICATIONS

This application is a National Phase entry of PCT/CA2015/051167 filed Nov. 12, 2015, in which the United States of America was designated and elected, and which remains pending in the international phase until May 13, 2017, which application in turn claims priority under 35 USC 119(e) from U.S. Provisional Application Ser. No. 62/079,021 filed Nov. 13, 2014.

BACKGROUND OF THE INVENTION

Field of the Invention

This invention relates a method of scavenging formaldehyde in particleboard (PB) or medium density fiberboard (MDF) made with urea-formaldehyde resin (UF) and/or melamine-urea-formaldehyde resin (MUF) using a special ammonium containing composition. In addition, the invention relates to a chemical, which can improve the curing speed of urea-formaldehyde-hardener system.

Description of Related Art

Generally, when urea-formaldehyde resin (UF) is used as adhesive for manufacturing composite boards, the adhesive releases the certain amount of formaldehyde into the environment after curing, especially when the cured adhesive is exposed to acidic and/or high-moisture environments. As we know, the formaldehyde is thought to contribute to human and animal illness. Therefore, it is desirable to reduce the release of formaldehyde into the environment.

With respect to the strict environmental regulations developed in recent years, wood composite manufacturers throughout the world are facing a great challenge to lower subsequent formaldehyde emissions from composite panels to significantly lower limits within a short period of time. For example, the formaldehyde emissions allowed for wood composites in North America was 0.3 ppm measured by a large chamber method before Jan. 1, 2009. However, the California Air Resources Board (CARB) issued a new standard for formaldehyde emissions which were effective on Jan. 1, 2009 for Phase I and Jan. 1, 2011 for Phase II as shown in Table 1. Thus, wood adhesive and composite manufacturers are starting to look for more effective formaldehyde scavengers and other means to lower the formaldehyde emissions from the particleboard and MDF bonded with UF resin and MUF resins to meet the new environmental regulations.

TABLE 1

Formaldehyde emission standards for particleboard (PB) and MDF (large chamber method)

| Effective Date | CARB | Standard (mg/kg or ppm), ASTM E1333 | | |
|---|---|---|---|---|
| | | PB | MDF | Thin MDF (8 mm) |
| Jan. 1, 2009 | Phase 1 | 0.18 | 0.21 | 0.21 |
| Jan. 7, 2009 | | — | — | — |
| Jan. 1, 2010 | Phase 2 | — | — | — |
| Jan. 1, 2011 | | 0.09 | 0.11 | — |
| Jan. 1, 2012 | | — | — | 0.13 |
| Jan. 7, 2012 | | — | — | — |

So far, various techniques have been used to reduce formaldehyde emissions from composite panels bonded with UF resins. A formaldehyde scavenger reduces formaldehyde emissions by reacting with free formaldehyde that might otherwise be released from PB or MDF panels. Meyer et al. (1980) used model sulphur compounds as a formaldehyde scavenger for UF resin system. Moore (1991) used melamine to lower formaldehyde emission of wood composites made with UF resin. Greene (1992) developed formaldehyde-scavenging process including the use of acetoacetamine as a formaldehyde scavenger for durable press finished fabrics using nitrogen containing methylol resin. Breyer et al. (1997) used low molar ratio MUF as a formaldehyde scavenger for wood composite applications. Park et al. (2008) also developed the low F/U molar ratio UF pre-polymer as formaldehyde scavenger for UF resin. They found that the mechanical properties of wood composites were related to the scavenger content in the resin system. Mechanical properties decreased as the scavenger dosage increased. Kim (2009) used volcanic pozzolan as a formaldehyde scavenger for UF resin bonded wood composites.

With a proper formaldehyde scavenger, it allows to use UF resins with high F/U molar ratios without increasing formaldehyde emissions or further to reduce formaldehyde emissions with low F/U molar ratio resins. It is well known that UF resins cure in acidic conditions generated by the reaction of the catalyst with free formaldehyde. The addition of urea or urea-formaldehyde oligomer can scavenge free formaldehyde, which leads to deficient acid for UF curing and results in less free formaldehyde available to react with catalyst. Therefore, the formaldehyde scavenging and panel performance become real paradox.

With the above concerns, a formaldehyde scavenger combination system is proposed. Such a system will not only effectively scavenge free formaldehyde but also do no harm to UF resin curing or panel performance without additional catalyst. A combination formaldehyde scavenger should help to improve product properties. It should also be economic, and its application should be simple and easily be adopted into the existing process, i.e., pre-mixing with UF resin before application without altering the resin pot life.

SUMMARY OF THE INVENTION

The present invention provides a method of scavenging formaldehyde in connection with multifunctional chemical scavenger compositions which accelerate the urea-formaldehyde curing speed, while lowering the subsequent formaldehyde emissions from the UF-bonded products.

In accordance with one aspect of the present invention, there is provided a method of scavenging formaldehyde from a wooden composite comprising urea-formaldehyde or melamine urea-formaldehyde, the method comprising: providing a furnish for at least one of a core layer and two face layer, providing at least one of a first formaldehyde scavenger (FS-C) and a second formaldehyde scavenger (FS-F); wherein the first formaldehyde scavenger is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof; wherein the second formaldehyde scavenger comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof; providing a urea-formaldehyde uncured resin or a melamine urea-formaldehyde uncured resin, wherein each uncured resin comprises an adhesive and a catalyst; mixing at least one of the following combinations i) the first formaldehyde scavenger (FS-C), the uncured resin and the furnish of the core layer; ii) the second formaldehyde scavenger (FS-F), the uncured resin and the furnish of the face layer; iii) the first formaldehyde scavenger (FS-C), the uncured resin and the furnish of the face layer; and iv) the second formaldehyde scavenger (FS-F), the uncured resin and the furnish of the core layer; producing at least one core layer having two sides from any one of i), ii), iii) and iv) combinations; applying at least one face layer on each of the sides of the core layer from any one of i), ii), iii) and iv) combinations; curing the core layer and the two face layers, whereby scavenging formaldehyde from the wooden composite.

In accordance with one aspect of the method herein described, wherein producing the core layer is from i).

In accordance with another aspect of the method herein described, wherein producing the face layer is from ii).

In accordance with yet another aspect of the method of any one of claims 1 to 3, wherein the core layer comprises $(NH_4)_2SO_4$ and one of $K_2S_2O_8$, or $(NH_4)_2S_2O_8$.

In accordance with still another aspect of the method herein described, wherein the solid weight of formaldehyde scavenger (FS-C) is 0.1 to 1 wt % of the total weight solids of resin in the core layer.

In accordance with a further aspect of the method herein described, the solid weight of formaldehyde scavenger (FS-F) is 15 to 20 wt % of the total weight solids in the face layer.

In accordance with another aspect of the present invention, there is provided a method of scavenging formaldehyde from a wooden composite comprising urea-formaldehyde or melamine urea-formaldehyde resin, providing a furnish for at least one of a core layer and a face layer, the method comprising: providing at least one of a first formaldehyde scavenger (FS-C) and a second formaldehyde scavenger (FS-F); wherein the first formaldehyde scavenger is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO_3$ $(NH_4)_2SO_4$ and combinations thereof; wherein the second formaldehyde scavenger comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof; providing an urea-formaldehyde uncured resin or a melamine urea-formaldehyde uncured resin; mixing at least one of the following i) the first formaldehyde scavenger (FS-C), the uncured resin and the furnish of the core layer; and ii) the second formaldehyde scavenger (FS-F), the uncured resin and the furnish of the face layer; producing at least one core layer from i) the core layer having two sides; applying a face layer on each of the sides of the core layer from ii); curing the core layer and the two face layers, whereby scavenging formaldehyde from the wooden composite produced.

In accordance with yet another aspect of the present invention, there is provided a wooden composite comprising at least one of a core layer having two sides, at least one face layer on each of the sides of the core layer, wherein each of the core layer and the face layers comprise: a urea-formaldehyde or melamine urea-formaldehyde resin, the resin comprising an adhesive and catalyst, wherein the at least one core layer further comprises a core furnish and a first formaldehyde scavenger, and each face layer further comprising a face furnish and a second formaldehyde scavenger, wherein the first formaldehyde scavenger (FS-C) is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof; wherein the second formaldehyde scavenger (FS-F) comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof.

BRIEF DESCRIPTION OF THE DRAWING

FIG. 1 illustrates a process flow diagram for scavenging formaldehyde from a wood composite material according to one embodiment of the present invention.

DETAILED DESCRIPTION OF THE INVENTION

The formaldehyde scavenger lowers subsequent formaldehyde emission from composite panels when the multifunctional compositions are used with urea-formaldehyde resin in manufacturing boards. The formaldehyde scavenger of the present invention is able to reduce the level of formaldehyde emission while also accelerating the curing speed and maintaining the physical properties, such as internal bond (IB). In some cases, depending on the dosage of formaldehyde scavenger and the manufacturing process, the formaldehyde scavenger will enhance some physical properties of the urea-formaldehyde resin and resulting products.

As used herein, the formaldehyde scavengers of the present invention include:
(a) Formaldehyde scavenger (FS-C), which can be used in the core layer and face layer of boards, but is preferred to be used in core layer;
(b) FS-C is a composition of at least two or more of the following components: potassium persulfate ($K_2S_2O_8$), ammonium persulfate $[(NH_4)_2S_2O_8]$, sodium persulfate $[Na_2S_2O_8]$, ammonium polyphosphate $[(NH_4)_3PO_4]$, monoammonium phosphate $[NH_4H_2PO_4]$, diammonium phosphate $[(NH_4)_2HPO_4]$, and urea $[(NH_2)_2CO]$, and ammonium sulphate. At a minimum FS-C contains ammonium sulphate and one of either potassium persulfate or ammonium persulfate);
(c) Formaldehyde scavenger (FS-F) can be used in the core layer and face layer of boards, but is preferred to be used in face layer;
(d) FS-F is a composition at least two of following components: potassium persulfate ($K_2S_2O_8$), ammonium persulfate $[(NH_4)_2S_2O_8]$, sodium persulfate $[Na_2S_2O_8]$, ammonium polyphosphate $[(NH_4)_3PO_4]$, monoammonium phosphate $[NH_4H_2PO_4]$, diammonium phosphate $[(NH_4)_2HPO_4]$, hydroxylamine hydrochloride [$NH_2OH \cdot HCl$], and urea [$(NH_2)_2CO$]. At a minimum FS-F contains two components: urea and hydroxylamine hydrochloride [$NH_2OH \cdot HCl$];

(e) The FS-C and FS-F can be used alone or used as combinations: both in face layer and core layer, or FS-F in the face and FS-C in the core;

(f) A certain amount of formaldehyde scavenger is mixed with UF adhesive right before applying for manufacturing boards.

It is to be understood that both the foregoing general description and the following detailed description are exemplary and explanatory only.

The invention is based on the discovery that the combination of a few chemicals is an effective formaldehyde scavenger when used as an additive to urea-formaldehyde adhesives. According to the present invention, a certain amount of formaldehyde scavenger is added to a urea-formaldehyde adhesive before the adhesive is applied to the furnish and before the adhesive is cured. Such the amount of the formaldehyde scavenger can be added up to about 20 wt % of the total adhesive solids, typically up to about 0.1-1 wt %, for FS-C; and about 15 wt % of the total adhesive solids for FS-F. Preferably, the resin will contain up to about 0.1-0.2 wt % for FS-C, and 10 wt % for FS-F based on the adhesive solids content.

Prior to use, the urea-formaldehyde adhesive and the formaldehyde scavenger are mixed. Board products made with urea-formaldehyde adhesives containing the formaldehyde scavenger of the present invention may be composite boards, such as particleboards, fiberboard, and chipboard.

The following examples are the purpose of illustration and are not intended to limit the scope of the claimed invention. The scope of the claims should not be limited by the preferred embodiments set forth in the examples, but should be given the broadest interpretation consistent with the description as a whole.

FIG. 1 illustrates the method 100 of preparing a wooden composite where free formaldehyde emission is substantially absent. Substantially absent is defined herein as below the level of standard requirement. The formaldehyde scavenger FS is prepared 10 from a first component 1 (a first formaldehyde scavenger) and a second component 2 (a second formaldehyde scavenger). The first formaldehyde scavenger is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof. The second formaldehyde scavenger comprises at least $(NH_4)_2CO$ and [$NH_2OH \cdot HCl$] and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof.

Typically, the first formaldehyde scavenger mixture 3 is transferred to preparation (or the resinating) of a core layer furnish 20 where an uncured core resin 5, the core furnish particles 6 and other components 28 (including catalysts 8i, wax 8j and water 8k) are combined. Similarly, the second formaldehyde scavenger mixture 4 is transferred with an uncured face resin 7 and a face furnish 9 along with other components 28 to produce (resinating) the face layer furnish combination in mixing method 30. The core layer furnish combination 21 and the face layer furnish combination 31 are transferred to produce or form a face-core-face three-layer sandwich mat in accordance with known methods 40. This formed three-layer mat is pressed (sandwiched) at elevated temperature and pressure to cure the resin in 50. This three-layer wooden composite is produced and is substantially absent of free formaldehyde.

Example 1

Preparation of Multi-functional Core Formaldehyde Scavenger (FS-C) for Amino Resins Including UF Resin and MUF Resin A 20 wt % aqueous FS-C solution was prepared, in which the component is chosen from potassium persulfate ($K_2S_2O_8$), ammonium persulfate [$(NH_4)_2S_2O_8$], or sodium persulfate [$Na_2S_2O_8$], either one or combination of two components could consists of multifunctional core formaldehyde scavenger. FS-C 1 mainly contains ammonium persulfate [$(NH_4)_2S_2O_8$], FS-C 2 mainly contains potassium persulfate ($K_2S_2O_8$).

Preparation of Surface Formaldehyde Scavenger (FS-F)

A 50% solution of FS-F was prepared. Two-component composition of FS-F was used here. The two components of face free formaldehyde scavenger used here are combination of urea and hydroxylamine hydrochloride. The ratio of hydroxylamine hydrochloride and urea is in the range of 1:6 to 1:30. In this particular example, the ratio of two components was one part of hydroxylamine hydrochloride [$NH_2OH \cdot HCl$], and fifteen parts of urea [$(NH_2)_2CO$]. The 50 wt % solution contained 3.13 wt % of hydroxylamine hydrochloride and 46.87 wt % of urea.

Example 2-4

Preparation of Three-layer Particleboard (PB) with UF Resin and Formaldehyde Scavenger FS-F Only Used in Face Layer Both face and core wood particles (also called furnishes) used in particleboard manufacturing were measured for size distribution. In each measurement, 170 g of particles with an average MC of 8-10% were separated by 9-, 14-, 18, 20-, 28-, 35-, 48- and 80-mesh sieves of Portable Sieve Shaker (Model RX-24) (W. S. Tyler Incorporated, Mentor, Ohio, USA) during 5 minutes of vibration. The 14-, 18-, 20-, 28-, 35-, 48- and 80-mesh sieves are corresponding to 2.00-, 1.40-, 1.00-, 0.84-, 0.60-, 0.50- and 0.30-mm opening screens, respectively. The particle size distribution, expressed as a weight percentage, was categorized as follows:

| Sieve | | Particle Size Distribution (% wt.) | |
|---|---|---|---|
| (mesh) | (mm) | Core | Face |
| <9 | >2.00 | 45.99 | 0 |
| 9-14 | 2.00-1.40 | 28.02 | 0.08 |
| 14-18 | 1.40-1.00 | 14.99 | 11.44 |
| 18-20 | 1.00-0.84 | 4.44 | 17.34 |
| 20-28 | 0.84-0.60 | 3.94 | 26.55 |
| 28-35 | 0.60-0.50 | 2.62 | 7.19 |
| 35-48 | 0.50-0.30 | 0 | 16.49 |
| 48-80 | 0.30-0.18 | 0 | 9.90 |
| >80 | <0.18 | 0 | 11.03 |
| Total | | 100 | 100 |

In Example 2, a commercial formaldehyde scavenger was applied in face layers of sandwich panel; In Example 3, the new formaldehyde scavenger FS-F was applied, and in Example 4, the panel without formaldehyde scavenger (control) was made. The ammonium sulfate (here after AS) was used as catalyst for Example 2-4. The catalyst dosages in core layer and face layer, and formaldehyde scavenger dosage in face layer were illustrated below:

TABLE 1

Formaldehyde scavenger and catalyst dosage for Example 2-4

| Example | Scavenger | Scavenger level Solid on solid UF (only in face) | Catalyst Face | Catalyst Core |
|---|---|---|---|---|
| Ex. 2 | commercial scavenger | 16.7% | AS/1.5% | AS/2.2% |
| Ex. 3 | FS-F | 16.7% | AS/1.5% | AS/2.2% |
| Ex. 4 (comparable) | — | — | AS/1.5% | AS/2.2% |

The formaldehyde scavenger FS-C prepared in EXAMPLE 1 was used in the core and the FS-F was used in the face. The face and core wood furnishes were obtained from a particleboard mill, which has been pretreated with urea. Both face and core binders were commercial UF resins obtained from a local resin company. The parameters of PB manufacturing are in Table 2.

TABLE 2

Particleboard manufacturing parameters

| | |
|---|---|
| Panel dimension | 12.7 mm × 610 mm × 610 mm |
| Panel construction | Three layers |
| Furnish | Face: Commercial particles from a particleboard mill, it contains ~0.28% urea based on oven dry weight. Core: Flake-like particles from a particleboard mill. It contains ~0.05% of urea based on oven dry wood |
| Mass Distribution | 24/52/24 face/core/face (dry basis) |
| Support | Caul plate at the bottom |
| Resin Content | Face: 8.55% (solids on a dry wood basis) Core: 7.0% (solids on a dry wood basis) |
| Slack wax content | Face: 0.3% (on a dry wood basis) Core: 0.2% (on a dry wood basis) |
| Air pressure for wax spray | 30 psi (lab practice) |
| Target mat MC | Face: 7.5% ± 0.5% Core: 5.3% ± 0.5% |
| Air pressure for resin spray | 50 psi (lab practice) |
| Resin flow rate | 150 mL/min (lab practice) |
| Target density | 675 kg/m³ (OD) |
| Blender dimension | 914 mm (diameter) × 914 mm (length) |
| Blender rotation speed | 11 rpm (lab practice) |

TABLE 2-continued

Particleboard manufacturing parameters

| | |
|---|---|
| Blending time | 6 min (lab practice) |
| Press temperature | 225° C. |
| Closing rate | As fast as possible (<15 seconds) |
| Total press time | 105 seconds (daylight to daylight) |
| Degas time | 20 seconds |
| Replicate | 2 |

After panels were made, they were trimmed in each edge by one inch, and all the panels were at ambient conditions prior to sampling. The panels were then cut for free formaldehyde test in 48 hours, and the remaining panels then were stored in a conditioning chamber (65% RH and 21° C.) for one more week, cut to Internal bonding (hereafter IB) specimens, and tested at moisture content (hereafter MC) around 8 wt %.

The free formaldehyde emissions of panels were tested by desiccator method and total formaldehyde content in the panel was tested by perforator method, and IB strength are listed in Table 3.

TABLE 3

Properties of panels for Example 2-4

| Example | Density kg/m³ | FF[1] μg/ml | LSCT[2] ppm | Perforator[3] mg/100 g | Perforator[3] mg/100 g | IB[4] MPa | IB[4] MPa |
|---|---|---|---|---|---|---|---|
| Ex. 2 | 675 | 0.182 | 0.075 | 4.20 | 4.40 | 0.52 ± 0.08 | 0.54 ± 0.08 |
| | 671 | | | | | 0.57 ± 0.07 | 0.59 ± 0.08 |
| Ex. 3 | 719 | 0.161 | 0.070 | 4.56 | 4.97 | 0.65 ± 0.06 | 0.63 ± 0.05 |
| | 693 | | | | | 0.65 ± 0.09 | 0.66 ± 0.09 |
| Ex. 4 | 583 | 0.273 | 0.110 | 5.84 | 6.65 | 0.62 ± 0.04 | 0.64 ± 0.04 |
| | 688 | | | | | 0.63 ± 0.08 | 0.64 ± 0.08 |

[1]free formaldehyde test by desiccator method
[2]equivalent to large scale chamber test
[3]test with perforator method, first column is measured value, second column is the value adjusted to 6.5% MC
[4]first column is measured value, and second column value is adjusted to 700 kg/m³, which is at around 8% MC Even though formaldehyde content in the panel for Example 3 is higher than the panel for Example 2 (with commercial free formaldehyde scavenger), but is much lower than Example 4. Apart from that, based on desiccator test, the free formaldehyde emission (convert to LSCT, which is currently used by industry), free formaldehyde emission of panel for Example 3 is 0.07 PPM, which is equivalent to or little lower than Example 2 (0.075), and much lower than control panel without formaldehyde scavenger (0.110 ppm). Based on the IB test, after adjustment, average IB value from Example 3 (0.65 MPa) is equivalent to Example 4 (0.64 MPa), but higher than Example 2 (0.57 MPa).

Examples 5-7

To evaluate the new formaldehyde scavenger FS-F prepared in Example 1, more three-layer sandwich PB panels were made with the formaldehyde scavenger and catalyst type and dosage as illustrated in Table 4 (below):

TABLE 4

Formaldehyde scavenger and catalyst dosage for Example 5-7

| | | Catalyst level Solid on solid UF | | FS-F content Solid on solid UF | |
|---|---|---|---|---|---|
| Example | Catalyst | Face layer | Core layer | Face layer | Core layer |
| Ex. 5 | AS | AS/1.5% | AS/2.2% | 10% | 0 |
| Ex. 6 | AS | AS/1.5% | AS/2.2% | 10% | 2% |
| Ex. 7 | AS | AS/1.5% | AS/2.2% | 10% | 5% |

The PB panels with FS-F in face only with lower dosage comparing with Example 3, and FS-F in both face and core layer (in Table 4) were manufactured. The process conditions are same as EXAMPLE 2-4, and illustrated in Table 2.

The free formaldehyde emission tested by desiccator method and formaldehyde content of panel by perforator method for Example 5-7 are shown in Table 5.

TABLE 5

Free formaldehyde emission and content panels for Example 5-7

| Run ID | FF[1] µg/ml | LSCT[2] ppm | Perforator[3] mg/100 g | mg/100 g |
|---|---|---|---|---|
| Ex. 3 | 0.161 | 0.07 | 4.56 | 4.97 |
| Ex. 5 | 0.174 | 0.07 | 4.89 | 5.27 |
| Ex. 6 | 0.214 | 0.09 | 4.31 | 4.87 |
| Ex. 7 | 0.174 | 0.07 | 4.20 | 4.43 |
| Ex. 4 | 0.273 | 0.110 | 5.84 | 6.65 |

[1] free formaldehyde test by desiccator method
[2] equivalent to large scale chamber test
[3] test with perforator method, first column is measured value, second column is the value adjusted to 6.5% MC Examples 8-19

In Example 8-11, the same commercial formaldehyde scavenger in Example 2 was applied in face layer, and new formaldehyde free formaldehyde scavenger FS-C 1 and FS-C 2 were applied in the core layer. The ratio of catalyst and FS-C could be from 6:1 to 30:1 based on different catalysts. In Example 12-19, the ratio of catalyst to FS-C is selected ~12:1. The new free formaldehyde scavengers FS-F, FS-C1 and FS-C2 were applied in face layer and core layer. Their dosage and catalyst and dosage are illustrated in Table 6.

TABLE 6

Formaldehyde scavenger and catalyst dosage for Example 8-20

| | Catalyst species and level (Solid on solid UF) | | Scavenger species and level (Solid on solid UF) | |
|---|---|---|---|---|
| Example | Face | Core | Face | Core |
| Ex. 8 | AS/1.5% | AS/1.02% | Com*., 16.7% | FS-C 1, 0.08% |
| Ex. 9 | AS/1.5% | AS/1.38% | Com, 16.7% | FS-C 1, 0.12% |
| Ex. 10 | AS/1.5% | AS/1.75% | Com, 16.7% | FS-C 1, 0.15% |
| Ex. 11 | AS/1.5% | AS/1.38% | Com, 16.7% | FS-C 2, 0.12% |
| Ex. 12 | AS/1.5% | AS/1.02% | FS-F, 10% | FS-C 1, 0.08% |
| Ex. 13 | AS/1.5% | AS/1.38% | FS-F, 10% | FS-C 1, 0.12% |
| Ex. 14 | AS/1.5% | AS/1.75% | FS-F, 10% | FS-C 1, 0.15% |
| Ex. 15 | AS/1.5% | AS/1.75% | FS-F, 10% | FS-F, 2%, FS-C 1 0.15% |
| Ex. 16 | AS/1.5% | AS/1.02% | FS-F, 16.7% | FS-C 1, 0.08% |
| Ex. 17 | AS/1.5% | AS/1.38% | FS-F, 16.7% | FS-C 1, 0.12% |
| Ex. 18 | AS/1.5% | AS/1.38% | FS-F, 16.7% | FS-C 2, 0.12% |
| Ex. 19 | AS/1.5% | AS/1.75% | FS-F, 16.7% | FS-F, 2%; FS-C-1, 0.15% |

*Com: commercial formaldehyde scavenger

The formaldehyde scavenger FS-C prepared in EXAMPLE 1 was used in the core (FS-C 1 mainly contains potassium persulfate, and FS-C 2 mainly contains ammonium persulfate) and the FS-F was used in the face. The face and core wood furnishes were obtained from a particleboard mill, which has been pretreated with urea. Face resin was commercial UF resin designed for face layer, and core resin was commercial UF resin designed core layer from local resin company. The parameters of PB manufacturing are given in Table 2.

The free formaldehyde emission tested by desiccator method and internal bonding strength of Example 8-19 are listed in Table 7.

TABLE 7

| Examples | FF[1] µg/ml | LSCT[2] ppm | Density Kg/m³ | IB[3] MPa | MPa |
|---|---|---|---|---|---|
| Ex. 8 | 0.249 | 0.10 | 668 | 0.59 ± 0.06 | 0.62 ± 0.05 |
| | | | 680 | 0.60 ± 0.04 | 0.62 ± 0.04 |
| Ex. 9 | 0.254 | 0.10 | 681 | 0.71 ± 0.05 | 0.73 ± 0.05 |
| | | | 678 | 0.70 ± 0.04 | 0.71 ± 0.04 |
| Ex. 10 | 0.238 | 0.10 | 688 | 0.70 ± 0.04 | 0.71 ± 0.04 |
| | | | 686 | 0.62 ± 0.10 | 0.63 ± 0.10 |
| Ex. 11 | 0.178 | 0.07 | 682 | 0.72 ± 0.06 | 0.70 ± 0.07 |
| | | | 685 | 0.64 ± 0.08 | 0.65 ± 0.07 |
| Ex. 12 | 0.211 | 0.09 | 685 | 0.63 ± 0.08 | 0.65 ± 0.08 |
| | | | 693 | 0.61 ± 0.15 | 0.66 ± 0.06 |
| Ex. 13 | 0.169 | 0.07 | 675 | 0.69 ± 0.04 | 0.71 ± 0.03 |
| | | | 692 | 0.70 ± 0.03 | 0.71 ± 0.03 |
| Ex. 14 | 0.241 | 0.10 | 705 | 0.78 ± 0.07 | 0.78 ± 0.07 |
| | | | 678 | 0.71 ± 0.09 | 0.73 ± 0.09 |
| Ex. 15 | 0.201 | 0.08 | 675 | 0.71 ± 0.08 | 0.73 ± 0.07 |
| | | | 671 | 0.71 ± 0.04 | 0.74 ± 0.04 |
| Ex. 16 | 0.154 | 0.06 | 690 | 0.66 ± 0.06 | 0.67 ± 0.06 |
| | | | 684 | 0.71 ± 0.06 | 0.72 ± 0.06 |
| Ex. 17 | 0.144 | 0.06 | 678 | 0.74 ± 0.03 | 0.77 ± 0.03 |
| | | | 677 | 0.70 ± 0.04 | 0.72 ± 0.04 |
| Ex. 18 | 0.135 | 0.06 | 678 | 0.68 ± 0.07 | 0.70 ± 0.06 |
| | | | 656 | 0.69 ± 0.06 | 0.73 ± 0.04 |
| Ex. 19 | 0.172 | 0.07 | 677 | 0.67 ± 0.06 | 0.68 ± 0.05 |
| | | | 687 | 0.67 ± 0.09 | 0.68 ± 0.08 |
| Ex. 4 | 0.273 | 0.11 | 583 | 0.62 ± 0.04 | 0.64 ± 0.04 |
| | | | 688 | 0.63 ± 0.08 | 0.64 ± 0.08 |

[1] free formaldehyde test by desiccators method;
[2] equivalent to large scale chamber test;
[3] first column is measured average value, second column is the value adjusted to 700 kg/m³ with around 8% MC Comparing with control (Ex. 4), Example 8-19 reduced the free formaldehyde emission. Ex. 17 and Ex. 18 lowered the free formaldehyde emission to 0.144 µg/ml, 0.135 µg/ml respectively, which equivalent to 0.06 ppm for LSCT. The internal bonding (IB) strength of Ex. 17-18 are at least equivalent to control (Ex. 4) or even higher. This means that combination of new formaldehyde scavenger FS-F and FS-C can significantly reduce free formaldehyde emission and also maintain the panel performance.

The invention claimed is:

1. A method of scavenging formaldehyde from a wooden composite comprising urea-formaldehyde or melamine urea-formaldehyde, the method comprising:
   providing a furnish for at least one of a core layer and a face layer,
   providing at least one of a first formaldehyde scavenger (FS-C) and a second formaldehyde scavenger (FS-F);
   wherein the first formaldehyde scavenger (FS-C) is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof;
   wherein the second formaldehyde scavenger (FS-F) comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof;
   providing an urea-formaldehyde uncured resin or a melamine urea-formaldehyde uncured resin, wherein each uncured resin comprises an adhesive and a catalyst;
   mixing
   i) the first formaldehyde scavenger (FS-C), the uncured resin and the furnish of the core layer; and
   ii) the second formaldehyde scavenger (FS-F), the uncured resin and the furnish of the face layer;
   producing at least one core layer having two sides from i);
   applying at least one face layer on each of the sides of the core layer from ii);
   curing the core layer and the two face layers,
   the solid weight of formaldehyde scavenger (FS-F) is 15 to 20 wt % of the total weight solids of resin in the face layer,
   whereby scavenging formaldehyde from the wooden composite.

2. The method of claim 1, wherein the core layer comprises $(NH_4)_2SO_4$ and one of $K_2S_2O_8$, or $(NH_4)_2S_2O_8$.

3. The method of claim 1, wherein the solid weight of formaldehyde scavenger (FS-C) is 0.1 to 1 wt % of the total weight solids of resin in the core layer.

4. A method of scavenging formaldehyde from a wooden composite comprising urea-formaldehyde or melamine urea-formaldehyde resin,
   providing a furnish for at least one of a core layer and a face layer, the method comprising:
   providing at least one of a first formaldehyde scavenger (FS-C) and a second formaldehyde scavenger (FS-F);
   wherein the first formaldehyde scavenger (FS-C) is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof;
   wherein the second formaldehyde scavenger (FS-F) comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof;
   providing an urea-formaldehyde uncured resin or a melamine urea-formaldehyde uncured resin;
   mixing at least one of the following
   i) the first formaldehyde scavenger (FS-C), the uncured resin and the furnish of the core layer; and
   ii) the second formaldehyde scavenger (FS-F), the uncured resin and the furnish of the face layer;
   producing at least one core layer from i) the core layer having two sides;
   applying a face layer on each of the sides of the core layer from ii);
   curing the core layer and the two face layers,
   whereby scavenging formaldehyde from the wooden composite.

5. A wooden composite comprising
   at least one of a core layer having two sides,
   at least one face layer on each of the sides of the core layer,
   wherein each of the core layer and the face layers comprise:
   a urea-formaldehyde or melamine urea-formaldehyde resin, the resin comprising an adhesive and catalyst,
   wherein the at least on core layer further comprises a core furnish and a first formaldehyde scavenger, and each face layer further comprising a face furnish and a second formaldehyde scavenger,
   wherein the first formaldehyde scavenger (FS-C) is at least one group selected from the group consisting of $K_2S_2O_8$, $(NH_4)_2S_2O_8$, and $Na_2S_2O_8$, and optionally comprising ammonium polyphosphate $(NH_4)_3PO_4$, $NH_4H_2PO_4$, $(NH_4)_2HPO_4$, $(NH_4)_2CO$, $(NH_4)_2SO_4$ and combinations thereof;
   wherein the second formaldehyde scavenger (FS-F) comprises at least $(NH_4)_2CO$ and $[NH_2OH.HCl]$ and optionally comprises $K_2S_2O_8$, $(NH_4)_2S_2O_8$, $Na_2S_2O_8$, ammonium polyphosphate $(NH_4)_3PO_4$, $NH_4H_2PO_4$, $(NH_4)_2HPO_4$, $(NH_4)_2SO_4$, and combinations thereof.

* * * * *